Aug. 17, 1965  A. J. HORSTMAN  3,201,307
PULPING EQUIPMENT AND SYSTEM
Filed Oct. 26, 1962
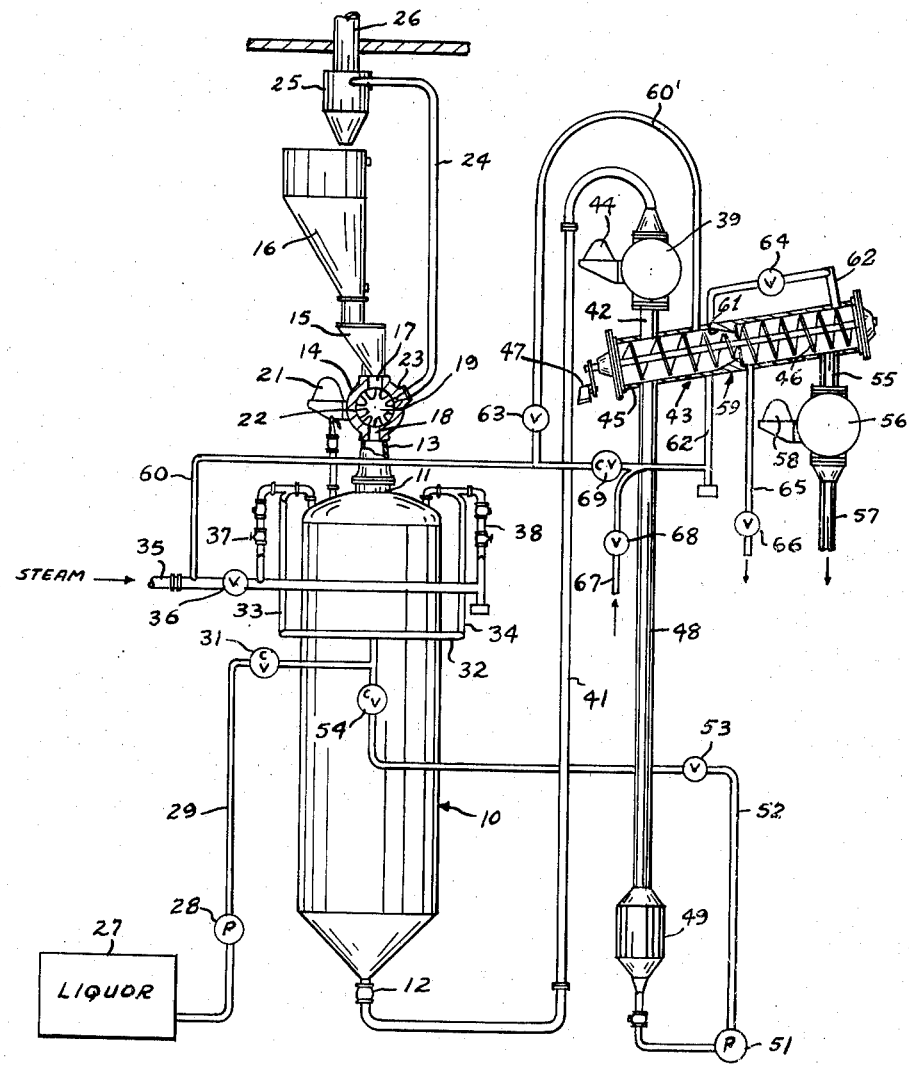
INVENTOR.
ANTON J. HORSTMAN
BY
Tom Walker
ATTORNEY

United States Patent Office 3,201,307
Patented Aug. 17, 1965

3,201,307
PULPING EQUIPMENT AND SYSTEM
Anton J. Horstman, Houghton, Mich., assignor to The Bauer Bros. Co., a corporation of Ohio
Filed Oct. 26, 1962, Ser. No. 233,224
6 Claims. (Cl. 162—246)

This invention relates to continuous pulping systems utilizing a digester and a drainer in series relation, and particularly to improvements yielding greater control and flexibility in such a system.

The object of the invention is to simplify the construction as well as the means and mode of operation of pulping systems, whereby such systems may be only be economically manufactured, but will be more efficient and satisfactory in use, adaptable to a wide variety of applications, and be unlikely to get out of order.

A further object of the invention is to introduce principles of segregation in a system as described enabling independent treatment of materials in the digester and in the drainer.

Another object of the invention is to provide a generally new drainer in a system as described segregated from the balance of the system and constructed for separate treatment of materials at one end while the other end drains black liquor from the digester.

A further object of the invention is to include in the system an intermediate control valve for positive control overflow quantities, discharge pressures, discharge temperatures and volume of black liquor recircular, with reference to the digester.

Still another object of the invention is to provide for controlled venting at the point of introduction of the solid material into the digester with provision further being made for subjecting the vented material to a separating operation with recovered solids being returned to the source thereof.

A further object of the invention is to provide a pulping system possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

The drawing is a diagram of a pulping or like system in accordance with the illustrated embodiment of the invention.

The invention is illustratively disclosed in a system producing pulp from fragmentary solids such as wood chips, the system being adapted for a continuous digesting process as distinguished from batch digesting. There is thus afforded the advantages of continuous digestion, including increased pulp production per cubic foot of digester space and uniformity of product, decreased corrosion rate, steam consumption, chemical consumption, heat loss due to black liquor recovery and lowered maintenance and labor. The system is adapted to treat any of the presently used raw materials and to produce any of the known types of chemical and semi-chemical pulps from dissolving grades to high yield grades. A pulping system as described may comprise a variety of condition sensing and control devices. In the interests of simplicity, the illustrated system omits sub-systems and controls not material to an understanding of the instant invention.

Referring to the drawing, a cylindrical tank-like vessel 10 is vertically arranged and constitutes the digester. The vessel is closed and is suitably formed at its ends for service as a pressure vessel. At the top thereof is an inlet fitting 11. At the bottom is an outlet fitting 12. The latter may suitably incorporate or connect with a valve used on start up and shut down of the system whereby to close off the bottom of the digester when it is not in use. An adapted 13 connects inlet fitting 11 to a valve housing 14 over which is a down spout 15 and a hopper 16. Valve housing 14 is formed with diametrically opposed openings 17 and 18 and has a rotor 19 therein turned by variable speed motive means 21. The rotor 19 has circumferential pockets 22 which in the rotation of the rotor successively pass openings 17 and 18. At a point intermediate the openings 17 and 18 the valve housing 14 has a vent opening 23, the location of such vent opening being determined in relation to the rotation of rotor 19 as to be encountered by the pockets 22 after passing opening 18 and before reaching opening 17. The vent opening 23 communicates through a conduit 24 with a centrifugal separator 25 having its underflow end in overlying relation to the hopper 16.

The hopper 16 is continuously supplied with fibrous fragments such as wood chips from a suitable source. These are in turn directed by down spout 15 to valve housing 14, entering the valve housing by way of opening 17. Rotor 19 picks up the admitted fragments which are accommodated in the pockets 23 and carries them a distance of some 180° where they are allowed to drop through opening 18 and through adapter 13 and inlet fitting 11 into the upper end of digester 10. The process is a continuous one as indicated, the fragmentary material being continuously admitted to the digester, with the rate of input being controlled by the variable speed means 21.

The rotor 19 makes a substantially sealing contact with the inner wall surface of valve housing 14 in a manner to inhibit a flow of pressure fluid thereby. Whatever pressure differential may exist as between the interior of the digester 10 and the atmosphere is accordingly not affected by the process of continuously admitting fragmentary solids to the digester. Higher than atmospheric pressures which may tend to be established in the pockets 23 as they pass opening 18 are, along with retained solid fibers and remnants, vented from the valve housing as the pockets pass opening 23. The vented material is directed by conduit 24 to the separator 25. There air and gases are separated from the solids and allowed to escape to atmosphere by way of outlet 26, with the solid material being returned to the chip hopper 16.

The rate of supply of wood fragments to the digester has been indicated as being determined by the speed of rotation of the rotor 19 in valve housing 14. Other, either supplemental or alternative, controls may be a part of the system, however, for example variable speed conveyors supplying hopper 16 and variable speed feed screw means within the hopper 16.

Chemical liquor is supplied to the vessel 10 in an amount to maintain a normal liquid level near the upper end of the vessel. A white liquor is drawn from a reservoir 27 for this purpose by a pump 28. Flowing by way of a conduit 29 past a check valve 31, the liquor reaches a manifold path 32 common to branches 33 and 34 both leading to the upper end of the tank 10 at opposite locations thereon. Steam likewise is admitted to the tank or vessel 10 and serves to wet the chips therein as well as to raise the internal pressure and temperature above normal levels. The steam is drawn from a suitable source by way of a line 35, flows past a valve 36 and enters vessel 10 by way of the same branches 33 and 34 as does the liquor, separate branches 37 and 38 for this purpose extending from line 35 beyond valve 36. Thus, as the wood fragments drop into the upper end of the vessel 10, they are sprayed by liquor and steam admitted through the branch conduits 33 and 34 which may communicate interiorally of the vessel with a suitable spray means. The digester vessel interior is or may be considered formed with zones of which the upper interior of the vessel above the liquor level is the preheating zone. At the lower end of the vessel in the area adjacent to outlet fitting 12 a discharge zone is formed, the upper end of this zone occurring approximately at the point where the conical shaped bottom begins. Intermediate the preheating zone and the discharge zone is the cooking zone wherein the wood chips are subjected to the combined effects of heat, pressure and chemical action in a manner to soften the chips and to free individual fibers thereof. In a process of continuous movement, and completely wetted by cooking liquor and steam, the column of chips passes downward out of the preheating zone into the cooking zone of the digester and then finally into the discharge zone. During passage through the cooking zone, the chips are digested to the extent desired by control of temperature, chemical concentration and rate of movement. The latter, determining the time interval during which the solids in the digester are exposed to the action of the chemicals and steam pressure therein, may be expressed in terms of reaction time or through-put in the digester.

In accordance with the instant invention a leading part in the control of through-put and reaction time is played by a valve device 39 where continuing flow line 41 terminates, such line extending from outlet fittings 12 at the bottom of the digester vessel 10. The valve is a duplicate of the valve controlling admission of the fragmentary material to digester vessel 10, which valve is for convenience referred to as valve 14. Thus, the device 39 has an outer housing and an inner rotor element having circumferential pockets. These in response to rotation of the inner valve element receive the output of digester vessel 10, carry it through a distance of 180° within the valve unit until registering with a continuing fitting 42 and at this point drop the contained material through such fittings into one end of a connecting drainer device 43. The rotation of the inner valve element is continuous in the operation of a system, being effected from a suitable variable speed motive means 44. The means defining flow path 41 is a closed conduit terminating as described in device 39. The latter, like valve 14, is constructed and arranged to permit no substantial pressure flow thereby. Accordingly, whatever pressure may be established in the vessel 10 is maintained by the valve device 39 which operates to pass controlled quantities of a mixture of solids and liquor while not permitting any appreciable flow of pressure fluid thereby. The described mixture is deposited by device 39 into the drainer 43 which may be considered as having a tubular shell 45 mounted in inclined fashion so that the end communicating with fitting 42 is lower than the opposite end. Longitudinally disposed in the tubular shell or housing 45 is rotary feed screw means 46 turned continuously in the operation of the system by a driving connection 47. The relatively lower end of the shell 45 may be considered the inlet end thereof while the opposite end is the outlet end. Communicating with the former or inlet end is one end of conduit means 48 leading by way of an expansion chamber 49 to pump means 51. The mixture of solids and liquor entering the inlet end of the drainer 43 encounters the feed screw means 46 and the upwardly sloping attitude of the drainer housing. Admitted liquids tend to seek out and to flow downward through conduit 48 while solids are picked up by the feed screw means 46 and advanced axially through the drainer toward the outlet end thereof, the feeding action tending to express additional liquid from the solids for carrying off by way of conduit 48. The separated liquid is a black heated liquor and is in this form redirected by pump 51 through a line 52 and past valves 53 and 54 to the manifold 32 and thence back to the digester vessel 10. All or portions of the separated black liquor may be differently disposed of if desired, as for example by being returned to a separate reservoir or by being directed by separate return lines to the vessel 10.

The solid material reaching the outlet end of drainer 43 is permitted to escape therefrom by way of an outlet fitting 55 communicating through a valve device 56 with an outlet line 57, the latter conducting the treated material for use or to other process equipment. The valve device 56 is a duplicate of valve 39 and valve 14. It effects a controlled discharge of the materials from the outlet end of the drainer under the influence of variable speed motive means 58 and tends to maintain whatever pressure differential may exist as between fitting 55 and outlet line 57.

In accordance with a further feature of the invention the drainer device 43 is constructed to provide a restriction intermediate the inlet and outlet ends thereof. This restriction in the illustrated instance is provided by an internal collar 59 presenting a sloping surface 61 to the material advancing under the urging of feed screw 46. The feed screw is suitably reduced in diameter intermediate its ends to pass through the reduced diameter portion of the strainer as defined by the collar 59.

The disclosed construction and arrangement of parts is one to segregate the drainer 43 between valve devices 39 and 56 and to segregate digester vessel 10 between valve devices 14 and 39. So adapted, the system lends itself to a plurality of control concepts and varying modes of operation. Discussing some of the more obvious concepts and operations, the pressure in the drainer may be held to a value lower than that of digester vessel 10 whereupon the inlet end of the drainer becomes a flash chamber wherein a rapid release of pressure in the discharged material assists in a separating of the liquids and solids as well as tending to accomplish a partial defibering of the solid material. Device 39 being adjustable either independently or in conjunction with device 14 controls the rate of movement of the fragmentary material through the digester vessel 10, hence varying reaction time with consequent variation in the degree and kind of treatment of the contained material. Pressures and temperatures in the drainer device may be varied and the system includes in this connection a branch extension 60 of steam line 35. The branch extension 60 in turn communicates with separate extensions 60' and 62 leading respectively to the inlet and outlet ends of the drainer 43. Valves 63 and 64 in the respective lines 60' and 62 enable these branch lines to be independently opened and closed. Accordingly, steam pressure may be admitted to either one or both of the ends of the drainer for raising pressure and temperature values therein.

Separate steam lines to opposite ends of the drainer 43 provide for uniform application of steam pressure but in accordance with the instant invention may serve independent treating purposes since the interposed collar 59 acting in conjuncture with the fed material may effect a positive barrier between the inlet ends of the drainer making possible separate and independent treatment of the materials in such respective ends. The solid material advanced by the feed screw means 46 is, upon encountering the sloping surface 61 of collar 59, constrained to move inward toward the axis of the shell 45. As a result a plug of solid material is formed at this point which although it is constantly in motion through the collar 59 presents a relatively dense formation inhibiting an exchange of fluids or fluid pressures between the opposite ends of the drainer. The outlet end of the drainer may thus have fluids separately admitted thereto and separately drained, a drain line 65 being provided for this purpose communicating with the interior of the drainer beyond collar 59 and having a valve 66 therein. The separate admission of steam to the outlet end of the drainer has been described. Other pressure fluids might be admitted thereto, as well as washing or treating liquids. A separate inlet line 67 having a valve 68 therein is provided for the latter purpose, such line leading to the branch extension 62 in advance of a check valve 69 therein. Washing, bleaching and like operations may thus be carried out in the outlet end of the drainer device while the inlet end continues to be used as a flash chamber as described, with excess liquid in the discharge end being drained off by line 65.

Applicant thus contemplates a system of wide variation in control and use. Reaction in the digester may be readily controlled and in a manner to leave the drainer 43 free to perform its intended function. Temperatures within the drainer and digester may be independently controlled. Thus, the temperature in one may be higher, lower or the same as the temperature in the other. Similarly the rate of movement of the pulp material through the drainer may be independently controlled. The pressure in the digester and in the drainer may be independently and widely varied. The pressure in either can be set higher or lower than the other, as may be desired or considered necessary. The use of gases or liquids different from those used in the digester may be introduced into the drainer by virtue of the restriction 59 as before described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Pulping and like apparatus, including a digester, a drainer, a connection therebetween providing that said drainer receives the output of said digester, three individual means operating respectively to effect a controlled admission of solids to said digester, to effect a controlled admission of the output of said digester to said drainer and to effect a controlled discharge of solids from said drainer, each of said individual means inhibiting loss of pressure fluid thereby, said three individual means operating to isolate the contents of said digester from the contents of said drainer for respectively separate treatment, intermediately positioned means providing separate treatment sections in said drainer on flow therethrough of solids and means in connection with each of said separate treatment sections for the independent and selective introduction thereto of pulp conditioning fluids.

2. In a pulping system a digester, a drainer receiving the output of said digester in the form of a mixture of solids and fluids, said drainer having feed means for advancing solids from end to end thereof, means forming an intermediate restriction in said drainer defining to one side thereof an inlet section and to the other side an outlet section, means for delivering the output of said digester to said inlet section including valve means passing controlled amounts of said mixture, said valve means segregating said drainer from pressure communication with said digester, said drainer having means for draining fluid from said inlet section and means for admitting fluid to said outlet section, said restriction forming means being of a nature to cause the solids, on advance of said solids therethrough by said drainer feed means, to form a plug which substantially segregates said inlet and outlet sections of said drainer and means for the selective and independent transmission of fluids to said admitting means to provide for the independent treatment of the solids in said outlet section.

3. A pulping system according to claim 2 characterized by said drainer having a drain for said outlet section located adjacent said restriction.

4. In a pulping system a digester, a drainer receiving the output of said digester in the form of a mixture of solids and fluids, said drainer having feed means for advancing solids from end to end thereof, means forming a passage restriction in said drainer and defining to one side thereof a drainer inlet section and to the other side a drainer outlet section, said drainer having means for independently draining fluids from said inlet and outlet sections, means for delivering the output of said digester to said drainer passing controlled amounts of said mixture to said drainer while segregating said drainer from pressure communication with said digester, said restriction forming means being of a nature to cause the solids, on advance of said solids therethrough by said drainer feed means, to form a plug of said solids to substantially segregate said drainer sections and means connecting with said drainer for the independent and selective admission of selected fluids to each of said drainer sections.

5. A pulping system including a digester and a drainer in series relation characterized by means to control the rate of throughput in said digester and to said drainer affording a pressure seal between said digester and said drainer and means forming relatively segregated drainer sections within said drainer each having inlet means in connection therewith to provide for independent fluid treatment of the materials which pass therethrough.

6. A pulping system including a digester and a drainer in series relation characterized by said drainer having means in connection therewith for maintaining a seal of its entrance and discharge portions while providing for flow therethrough and collar means providing an intermediate restriction in said drainer and presenting a sloping surface to said entrance portion, the flow of solid type materials through said drainer producing a plug of said materials in the vicinity of said collar which substantially isolates the respective drainer portions to either side of said collar and inlet means in connection with said drainer portions to either side of said collar providing for the independent and differential treatment of the solids within said portions.

References Cited by the Examiner

UNITED STATES PATENTS

| 2,858,212 | 10/58 | Durant et al. | 162—237 |
| 2,893,909 | 7/59 | Shouvlin et al. | 162—17 |
| 2,966,215 | 12/60 | Durkee | 162—237 |
| 3,052,592 | 9/62 | Eberhardt | 162—17 |
| 3,070,156 | 12/62 | Starrett | 162—237 |
| 3,085,624 | 4/63 | Horstman | 162—237 |

FOREIGN PATENTS

| 438,443 | 8/48 | Italy. |
| 149,161 | 3/55 | Sweden. |
| 1,222,196 | 1/60 | France. |

DONALL H. SYLVESTER, *Primary Examiner.*

MORRIS O. WOLK, WILLIAM B. KNIGHT,
*Examiners.*